Jan. 9, 1962 H. E. TUCKER Re. 25,110

DRAFT GEAR FOR RAILWAY CARS

Original Filed Sept. 7, 1951 2 Sheets-Sheet 1

INVENTOR.
Herbert E. Tucker
BY
Mann, Brown & Hausmann,
Attys.

DRAFT GEAR FOR RAILWAY CARS

Original Filed Sept. 7, 1951 2 Sheets-Sheet 2

INVENTOR.
Herbert E. Tucker.
BY
Mann, Brown & Hausmann
Attys.

United States Patent Office

Re. 25,110
Reissued Jan. 9, 1962

25,110
DRAFT GEARS FOR RAILWAY CARS

Herbert E. Tucker, Chicago, Ill., assignor to Cardwell Westinghouse Company, a corporation of Delaware Original No. 2,738,078, dated Mar. 13, 1956, Ser. No. 245,573, Sept. 7, 1951. Application for reissue Dec. 23, 1957, Ser. No. 704,848
8 Claims. (Cl. 213—45)

Matter enclosed in heavy brackets [ ] appears in the original patent but forms no part of this reissue specification; matter printed in italics indicates the additions made by reissue.

This invention relates to draft gears for railway cars, and has for its principal object to provide a relatively soft cushioning unit of short travel and low capacity acting in buff and in draft, and a relatively hard long travel cushioning unit of high capacity also acting in buff only and in series with the relatively soft cushioning unit.

Figure 1:
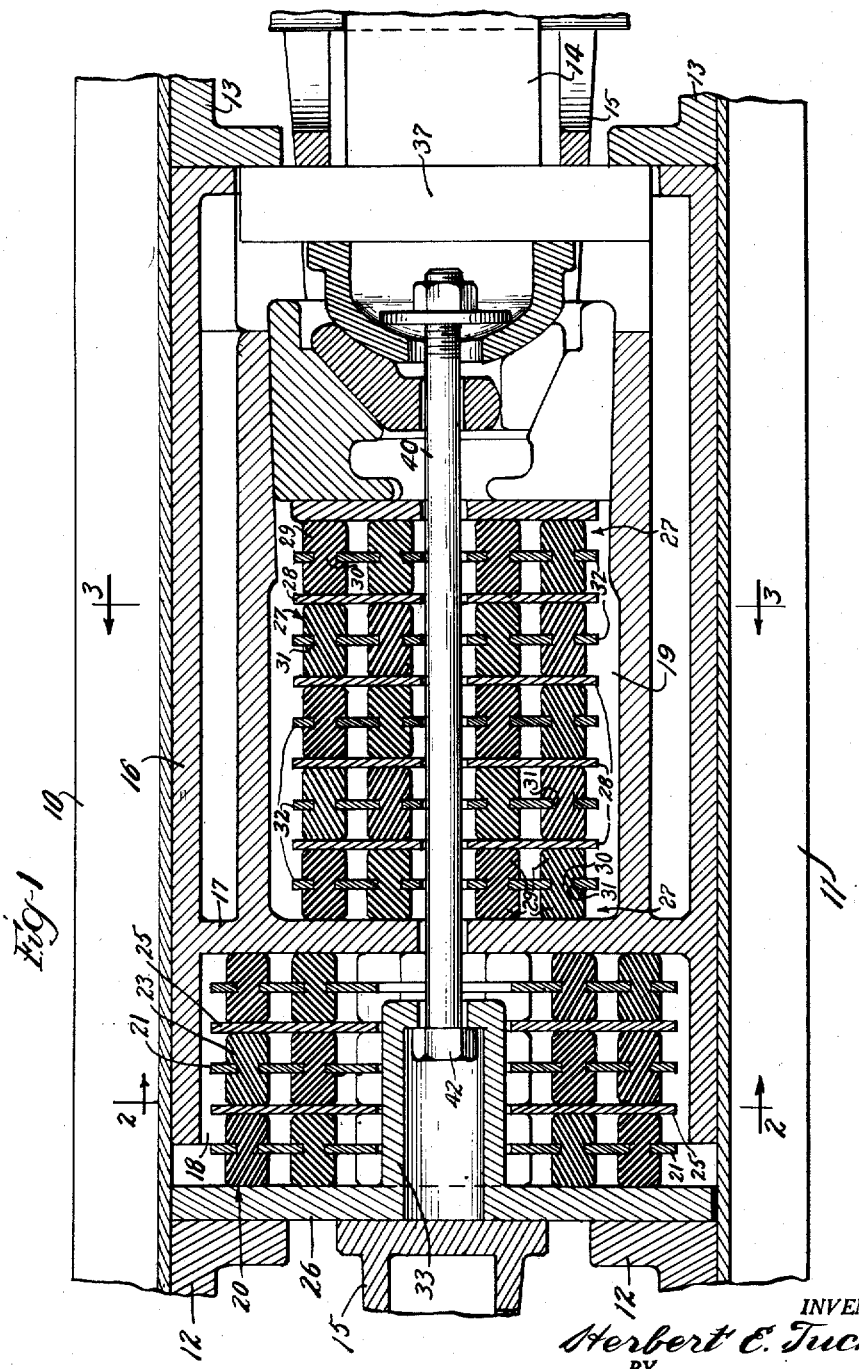
Figure 2:
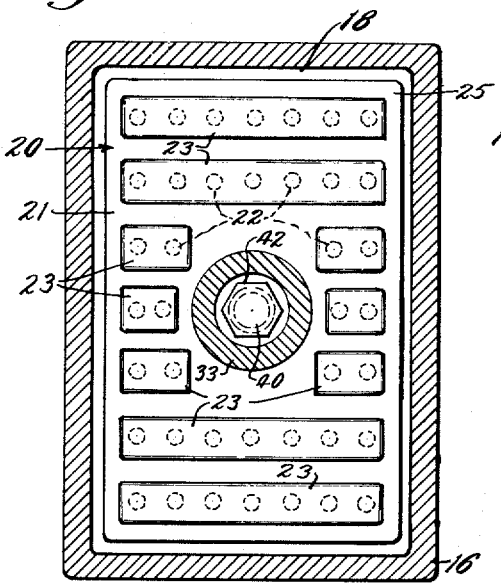
Figure 3:
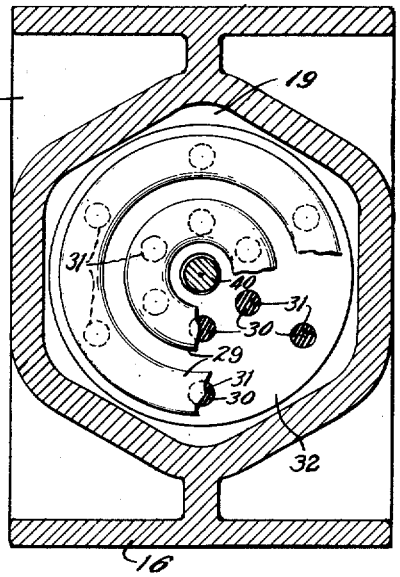
Figure 4:
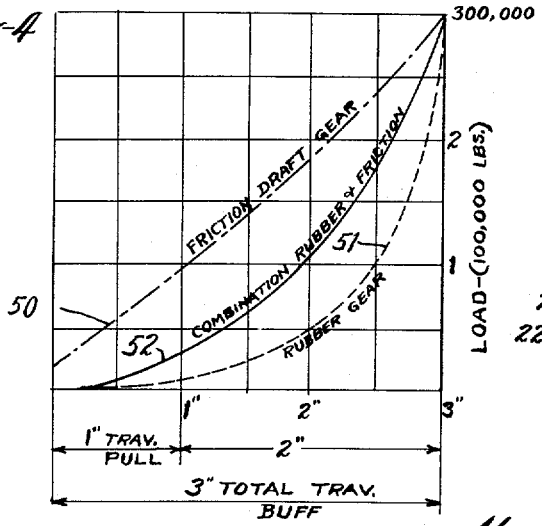
Figure 5:
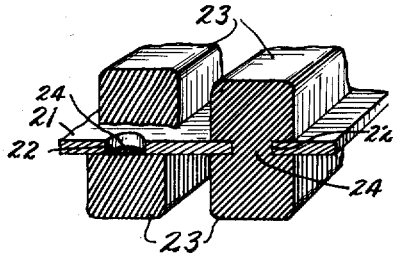

Other objects and advantages of the invention will appear as the description is read in connection with the accompanying drawings, in which:

FIG. 1 is a horizontal section through the draft gear and associated parts;

FIGS. 2 and 3 are cross-sections on the lines 2—2 and 3—3 of FIG. 1 respectively;

FIG. 4 is a diagram giving comparative curves of the two cushioning units and a combination of the two; and FIG. 5 is a perspective view indicating how the resilient elements or spring elements are made up.

In the drawings, 10 and 11 indicate spaced sills equipped with draft lugs 12 and 13 which together define a conventional draft gear pocket. Associated with those parts is a coupler shank 14 and a draft yoke 15 connected to the coupler shank in any suitable way.

The draft gear includes a housing 16 divided by a partition 17 into a generally rectangular rear chamber 18 (FIG. 2) for the low capacity cushioning unit, and a generally hexagonal front chamber 19 (FIG. 3) for the high capacity cushioning unit.

The soft, low capacity or rear cushioning unit is made up of resilient elements or spring elements, generally indicated by 20, alternating with spacers. As shown in FIG. 5, each element is made up of a plate 21 of relatively incompressible material (preferably steel 3/16" S.A.E. 1010 is satisfactory) provided with rows of aligned, spaced openings 22, rubber bars or mats 23 overlying the rows of openings on each side of the plate are connected by plugs 24. The bars and plugs are of material such as rubber composition, of suitable durometer hardness, for example 58 to 62. The connection between the bars and the plugs, or one bar and the plugs, is effected by vulcanizing, which may, or may not, also make the bars fast to the steel plates.

In making up the soft, low capacity cushioning unit in this embodiment, three resilient or rubber elements, including plates 21 and rubber blocks 23, alternate with steel spacer plates 25, the group or pack having an overall length in excess of the length of the chamber 18 approximately one inch, thus providing a one-inch soft travel low capacity cushion for buff and draft shocks. In use, it is assembled between the partition 17 and a back follower plate 26.

The high capacity long travel cushioning unit or front unit is preferably substantially as disclosed in the patent to Cardwell, 2,496,442 of February 7, 1950. However, in this instance the inner and outer coil springs are shown replaced by a cushioning element composed of five main rubber springs, generally indicated by 27 in FIG. 1, alternating with spacers 28. Each rubber spring is made up of a plate 32 provided on each side with concentric rubber rings 29 connected by blocks 30 through openings 31 formed in the plate 32.

The remainder of the friction draft gear disclosed in the said Cardwell patent is not here described in detail, but the disclosure in that patent is included by reference in the interest of brevity.

The rear follower 26 has a hollow boss 33 which receives the headed end 42 of the bolt 40 which passes through the friction draft gear and serves to retain the units in assembled relation, as shown in FIG. 1.

A front follower 37 is disposed between the coupler shank 14 and the friction cushioning unit and transmits buff loads therebetween. The front follower is limited in its forward travel by abutment with the front draft lugs 13.

In operation, the soft low capacity rubber cushioning unit provides one inch travel in all important draft shocks. The action is soft and easy and has plenty of capacity and travel.

That soft low capacity cushioning unit also provides one inch travel on the rubber in buff. Any light buffing shocks will probably be taken care of mostly by the rubber, though undoubtedly as it reaches the end of its compression the friction will come in play. The two cushioning units acting together provide full three inches of travel in buff, and while light buff shocks are taken principally by the soft low capacity unit there is necessarily a blending, and as the low capacity unit reaches the capacity of limited travel the friction draft gear comes into full play for two inches, or approximately two inches, of capacity.

Generally speaking, the high capacity cushioning unit will be idle until there is a buff shock approaching the capacity or exceeding the capacity of the soft, low cushioning unit. When that occurs, the friction of the high capacity unit will come into play and take care of the shock.

Referring to FIG. 4, the results are graphically shown. The characteristic curve of the Cardwell friction gear shown at 50 approaches a straight line when plotted with inches of travel as abscissa and loads as ordinates. The characteristic curve of the low capacity cushioning unit indicated at 51 is quite a long curve. The combination of the two is indicated by the curve 52 from which it will appear that the draft gear is softer than friction draft gears when considered as a whole, but has the softness of a rubber draft gear for draft shocks or buff shocks within the capacity of the low soft cushioning unit.

Wherever in the specification and claims the terms "hard" and "soft" are employed to describe the cushioning units they should be understood to refer to the cushioning units as a whole and not necessarily to the individual elements thereof. The characteristic load-deflection curve for a relatively hard cushioning unit, of course, shows that for a given increment of load there results only a small deflection, whereas the characteristic load-deflection curve for a relatively soft cushioning unit for a similar increment of load would produce a substantially greater deflection.

I claim:

1. In a draft gear for a railway car having a draft gear pocket, a draft yoke, followers movable by the yoke, and spaced stops against which the followers normally rest, a housing mounted in the draft pocket for longitudinal movement therein between one of said stops and one of said followers, said housing normally occupying a position with one end thereof abutting said one stop and the opposite end thereof spaced from said one follower, a partition wall in said housing dividing it into two chambers, a cushioning unit in one of said chambers between said partition wall and said one follower, said cushioning unit including a series of rubber blocks alternating with relatively incompressible plates, a friction cushioning unit in the other of said chambers between said partition wall and the other of said followers, said one follower being movable by said draft yoke away from its associated stop to cause said first mentioned cushioning unit to act in draft, said housing, during such movement of said one follower, being held against movement by the stop which it normally abuts, whereby said friction cushioning unit is prevented from acting in draft, said other follower being movable by said draft yoke away from its associated stop to cause both of said cushioning units to cooperatively act in buff.

2. In a draft gear for a railway car having a draft gear pocket, a draft yoke, followers movable by the yoke, and spaced stops against which the followers normally rest, a housing mounted in the draft pocket for longitudinal movement therein between one of said stops and one of said followers, said housing normally occupying a position with one end thereof abutting said one stop and the opposite end thereof spaced from said one follower, a partition wall in said housing dividing it into two chambers of different lengths and cross-sections, a short travel cushioning unit in the shorter chamber between said partition wall and said one follower, said cushioning unit including a series of rubber blocks alternating with relatively incompressible plates, a friction cushioning unit in the second chamber between said partition wall and the other of said followers, said short travel cushioning unit being softer than said friction cushioning unit, said one follower being movable by said draft yoke away from its associated stop to cause said first mentioned cushioning unit to act in draft, said housing, during such movement of said one follower, being held against movement by the stop which it normally abuts, whereby said friction cushioning unit is prevented from acting in draft, said other follower being movable by said draft yoke away from its associated stop to cause both of said cushioning units to cooperatively act in buff.

3. In a draft gear for mounting in a draft gear pocket of a railway car, said pocket having front and rear stop lugs, and adapted to be actuated by a coupler yoke encircling the gear, a housing mounted in the pocket for longitudinal movement therein, a partition wall in said housing dividing it into two chambers of different lengths, a rear cushioning unit in the chamber of shorter length and having one end abutting said partition wall, a rear follower abutting the opposite end of said cushioning unit, said rear follower and housing having cooperating portions for limiting relative movement of said follower toward said partition wall, and said portions being in longitudinally spaced relation whereby said follower may move toward said partition wall to cause said cushioning unit to act in draft, a front cushioning unit in the chambers of greater length and having one end thereof abutting said partition wall, a front follower abutting the opposite end of said front cushioning unit, said front follower and said housing being movable toward said rear follower to cause both of said cushioning units to act in buff, said housing normally abutting against said front stops to prevent movement thereof when the gear is acting in draft whereby said front cushioning unit is prevented from acting in draft.

4. The invention recited in claim 3, wherein said rear cushioning unit is softer than said front cushioning unit.

5. In a draft gear for mounting in a draft gear pocket of a railway car, said pocket having front and rear stop lugs, and adapted to be actuated by a coupler yoke encircling the gear, a housing mounted in the pocket for longitudinal movement therein, a partition wall in said housing dividing it into front and rear chambers, a rear cushioning unit in said rear chamber having one end thereof abutting said partition wall, a rear follower abutting the opposite end of said cushioning unit, said follower and housing having cooperating portions for limiting relative movement of said rear follower toward said partition wall and said portions normally being in longitudinally spaced relation whereby said follower may move toward said partition wall to cause said rear cushioning unit to act in draft, a front cushioning unit in said front chamber having one end abutting said partition wall, and a front follower abutting the opposite end of said front cushioning unit, said front follower and said housing being movable toward said rear follower to cause both of said cushioning units to act in buff, said housing normally abutting against said front stops to prevent movement thereof when the gear is acting in draft whereby said front cushioning unit is prevented from acting in draft.

*6. A selective travel draft gear arrangement for use with coupler-yoke means in a railway car underframe that has a draft gear pocket, said underframe having front and rear stop means at opposite ends of said pocket and in which the draft gear arrangement provides greater cushioned travel in buff than in draft, the combination of a draft gear casing mounted in said pocket and having an open front end, cushioning mechanism in the casing including friction-producing elements projecting through said open end of the casing, front and rear follower means positioned at opposite ends of the casing and engageable with said coupler-yoke means and said stop means, means including said cushioning mechanism biasing one end of the casing against one of said stop means when the gear is in its release position and with the casing being of such length with respect to the pocket and said follower means that the casing is capable of movement within said pocket limited to an amount equal to the desired maximum draft travel, said casing adjacent the open end thereof having longitudinally spaced shoulders, the forward or outermost one of which is adapted to react against said front stop means, and the innermost one being adapted to engage said front follower means, said front follower means having a cross-sectional shape compatible to that of the open end of the casing whereby it may move into said open end of the casing in flanking relationship to said outermost shoulders and against said innermost shoulders, whereby on draft said outermost shoulders limit forward travel of said coupler-yoke means, and on buff said innermost shoulders limit rearward travel of said coupler-yoke means.*

*7. A selective travel draft gear arrangement for use with coupler-yoke means in a railway car underframe that has a draft gear pocket having front and rear stop means at opposite ends of the pocket and in which the draft gear arrangement provides greater cushioned travel in buff than in draft; in combination, compression members providing a casing having an open end and front and rear follower means for opposite ends of the casing, said casing having the open end thereof formed to provide outwardly directed, longitudinally spaced outer and inner sets of shoulders, the follower means for the open end of said casing having a cross-sectional shape conforming to the arrangement of the inner set of shoulders to accommodate longitudinal movement thereof through the space between the shoulders of said outer set for engagement against the shoulders of said inner set and being of less dimension lengthwise than the lengthwise spacing between said outer and inner sets of shoulders, with the other of said follower means overlapping the other end of said casing for solid abutment therewith in limiting buff travel of said coupler-yoke means, said front follower means having a central portion engageable with said coupler-yoke means and edge portions engageable with said front stop means and said rear follower means having a central portion engageable with said coupler-yoke means and having edge portions engageable with said rear stop means, and cushioning mechanism in said casing reacting between said front and rear follower means and including friction-producing elements engageable internally with said casing and projecting through the open end thereof for engagement with the follower means thereadjacent, said casing being of such*

*length with respect to said pocket and said front and rear follower means that the casing is capable of movement in said pocket to an amount corresponding to the maximum draft travel of said arrangement, with the portion of said casing between said inner set of shoulders and said other end thereof being stressed in compression by engagement between said front and rear follower means in limiting buff movement of said coupler-yoke means, and with the portion of said casing between said outer set of shoulders thereof and said other end thereof being stressed in compression by reaction between the front stop means and the coupler-yoke means in limiting draft movement of said coupler-yoke means to an amount less than the permissible buff movement thereof.*

*8. In a draft gear for mounting in a draft gear pocket of a railway car, said pocket having front and rear stop lugs, and adapted to be actuated by a coupler yoke encircling the gear, a housing mounted in the pocket for longitudinal movement therein and having a fixed internal partition wall dividing the housing into front and rear chambers, a rear cushioning unit in said rear chamber and having one end thereof abutting said partition wall, a rear follower disposed between the other end of said rear cushioning unit and the rear stop lugs and movable forwardly with said yoke to compress said rear cushioning unit in draft, said rear follower normally abutting said rear stop lugs and said rear cushioning*

*unit reacting against said rear stop lugs through said rear follower to normally bias said housing forwardly against said stop lugs for preventing movement thereof when the gear is acting in draft, a front cushioning unit in said front chamber having one end abutting said partition wall and front follower means interposed between said coupler and the opposite end of said front cushioning unit for movement rearwardly towards said partition wall in response to rearward movement of the coupler to cause both of said cushioning units to act in buff.*

References Cited in the file of this patent or the original patent

UNITED STATES PATENTS

| | | |
|---|---|---|
| 776,390 | Gallagher | Nov. 29, 1904 |
| 911,902 | O'Connor | Feb. 9, 1909 |
| 922,619 | O'Connor | May 25, 1909 |
| 1,096,120 | O'Connor | May 12, 1914 |
| 1,113,916 | Spencer | Oct. 13, 1914 |
| 1,123,356 | O'Connor | Jan. 5, 1915 |
| 1,136,029 | Miner | Apr. 20, 1915 |
| 1,228,830 | Schmidt | June 5, 1917 |
| 1,702,675 | Ventura | Feb. 19, 1929 |
| 1,807,132 | Pappas et al. | May 26, 1931 |
| 1,853,857 | Glascodine et al. | Apr. 12, 1932 |
| 1,860,540 | Haseltine | May 31, 1932 |
| 1,950,609 | Haseltine | Mar. 13, 1934 |